(12) United States Patent
Jackson et al.

(10) Patent No.: US 7,233,263 B2
(45) Date of Patent: Jun. 19, 2007

(54) ANALOG ACTUATION ALLOCATION STRUCTURE WITH MANY ACTUATORS

(75) Inventors: Warren B. Jackson, San Francisco, CA (US); David Kalman Biegelsen, Portola Valley, CA (US); Markus Peter Johannes Fromherz, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 1279 days.

(21) Appl. No.: 10/042,543

(22) Filed: Jan. 8, 2002

(65) Prior Publication Data

US 2003/0127616 A1 Jul. 10, 2003

(51) Int. Cl.
*H03K 17/94* (2006.01)

(52) U.S. Cl. ............................. 341/34; 341/21; 341/22; 341/33; 178/18.01; 178/18.05; 345/173; 345/174

(58) Field of Classification Search .................. 341/34, 341/22, 33, 35, 21; 340/854.9, 825.9; 700/292; 251/129.01; 347/116, 134, 257, 258; 345/63, 345/89, 100, 111, 147, 173; 200/512; 178/18.05, 178/18.01; 349/201; 364/558; 701/223
See application file for complete search history.

(56) References Cited

U.S. PATENT DOCUMENTS

| | | | |
|---|---|---|---|
| 3,798,370 A | | 3/1974 | Hurst |
| 4,755,634 A | * | 7/1988 | Pepper, Jr. ................ 178/18.01 |
| 5,453,941 A | * | 9/1995 | Yoshikawa ................... 701/223 |
| 5,493,326 A | | 2/1996 | Andrews et al. |
| 5,567,971 A | | 10/1996 | Jackson et al. |
| 5,625,387 A | | 4/1997 | Moon |
| 6,039,316 A | | 3/2000 | Jackson et al. |
| 6,504,492 B1 | * | 1/2003 | Muurinen ..................... 341/22 |

OTHER PUBLICATIONS

Konishi et al., "System Design for Cooperative Control of a Microactuator Array," *Ieee Transactions on Industrial Electronics*, IEEE Inc., New York, U.S. vol. 42, No. 5, Oct. 1, 1995), pp. 449-454.
European Search Report, Application No. EP 03 0095, Munich, Germany, Apr. 8, 2003.

* cited by examiner

*Primary Examiner*—Jeffery Hofsass
*Assistant Examiner*—Sisay Yacob
(74) *Attorney, Agent, or Firm*—Fay Sharpe LLP (57) ABSTRACT

A system and method for allocation of actuators is provided. Electrodes having several voltages are assigned to actuators within correlation regions of the actuators. By varying the voltages, a desired actuation profile for the actuators may be achieved.

10 Claims, 8 Drawing Sheets

FIG. 8

ANALOG ACTUATION ALLOCATION STRUCTURE WITH MANY ACTUATORS

TECHNICAL FIELD

The present invention relates generally to actuators, and specifically relates to actuation allocation structure with many actuators.

BACKGROUND OF THE INVENTION

Many systems employ actuators to apply forces to objects. For example, smart matter systems or materials are physical objects having arrays of actuators for applying forces in response to the detection of changes in their environment. Smart matter can be used to move sheets of paper in a printing machine or maneuver an aircraft by performing tiny adjustments to wing surfaces. In the former example, actuators in the form of air jets apply forces to a sheet of paper to direct the motion of the sheet through the printing machine.

With the advent of low cost actuators such as those produced by batch fabrication, systems with large numbers of actuators are being contemplated. A major problem in such many actuator systems is addressing and controlling the actuators in a low cost manner. Matrix addressing may work for only some kinds of actuators, and in high density configurations, even this addressing scheme can result in too many costly connections to the controlling electronics. Moreover, the communication between the actuators and the controlling electronics can be expensive if it requires many channels of communication and individually controlled power.

Figure 1:
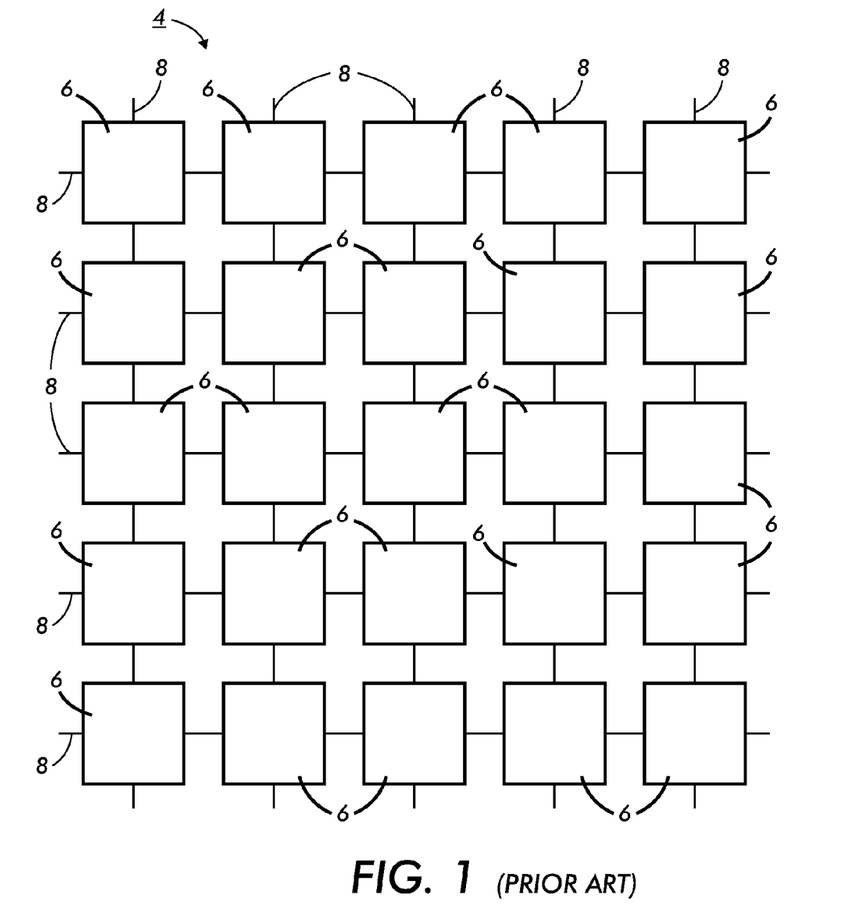
FIG. 1 shows a conventional actuator system.

For example, referring to FIG. 1, a conventional actuator array 4 is shown containing twenty-five actuators 6. Ten electrodes 8 control the actuators (for a general N×M array, N+M electrodes are used to control the actuators). To activate the actuator in the second row and third column, for example, an electrical signal is sent to this actuator using the electrode that controls the second row and the electrode that controls the third row.

In systems employing smart matter, which contain many actuators, running numerous electrodes to individually control each actuator can be expensive and unwieldy. Individual electrode lines must be routed into an array, drive electronics with a capability for handling each actuator must be built, and the actuation data rates must be correspondingly high, thereby loading down communication channels.

SUMMARY OF THE INVENTION

Systems and methods are described herein for analog actuation allocation in structures with many actuators that address the aforementioned shortcomings of known actuator systems. Conventional methods, in which each actuator is individually controlled with electrodes, are costly and often unnecessary because each actuator tends to be highly correlated with its neighbors.

Described herein is a structure using analog electronics for allocating actuation in a way that greatly reduces the number of control lines. The structure is also compatible with hierarchical smart matter control. A reduction in communication bandwidth for smart matter systems is obtained by addressing groups of actuators of a size given by a correlation region rather than by addressing each individually. Smart matter actuators can be addressed in groups, rather than individually, with an adjustable size of the grouping. The average variations (or gradient) of actuation from actuator to actuator can also be accommodated. Thus, the number of lines can be reduced by a factor of twenty-five or more, but more importantly for real time operating systems, the data rate can be greatly reduced as only averages and, optionally, gradients need to be transmitted to the actuator array.

In particular, a system for producing an actuator response, such as a force, heat output, chemical emission, or swelling, is described herein. The system includes a plurality of rows of actuators capable of producing an actuator response in reply to a control signal, and a resistive strip connected to the plurality of rows of actuators. The system further includes a first electrode having a first voltage connected to the resistive strip and a second electrode having a second voltage connected to the resistive strip for transmitting the control signal to the rows of actuators to thereby cause the rows of actuators to produce the actuator response.

The length of the resistive strip can be substantially equal to a correlation length in which each row in the plurality of rows is mechanically correlated to every other row in the plurality of rows.

The first voltage can have a value $V_1$ and the second voltage can have a value $V_2$ such that $(V_1+V_2)/2$ is chosen to approximate a desired actuation profile. Specifically, $(V_1+V_2)/2$ can be chosen to substantially equal an average value of the desired actuation profile over a position substantially equal to a location of the resistive strip.

Likewise, the first voltage can have a value $V_1$ and the second voltage can have a value $V_2$ such that $(V_1-V_2)$ is chosen to approximate a desired actuation profile. Specifically, $(V_1-V_2)$ can be chosen to substantially equal an average slope of the desired actuation profile over a position substantially equal to a location of the resistive strip.

Also described herein is a system for producing an actuator response, the system including a plurality of rows of actuators capable of producing an actuator response in reply to a control signal. The system further includes a resistive strip connected to the plurality of rows of actuators, and N electrodes, where N is an integer greater than one, having a voltage $V_1, \ldots, V_N$, each electrode being connected to the resistive strip to transmit the control signal to the rows of actuators to thereby cause the rows of actuators to produce the actuator response.

For two dimensional configurations, a system for producing an actuator response is also described herein. The system includes a resistive sheet, and an array of actuators electrically connected to the resistive sheets via contacts. The system further includes and a plurality of electrodes for fixing voltages on the resistive sheet, wherein by varying the voltages a desired actuation profile can be produced by the array of actuators to produce the actuator response.

Also described herein is a method for producing an actuator response. The method includes electrically connecting a plurality of rows of actuators to a resistive strip, the actuators capable of producing an actuator response in resply to a control signal. The method further includes applying a first voltage to the resistive strip via a first electrode, and applying a second voltage to the resistive strip via a second electrode, wherein the application of the first voltage and the second voltage provides the control signal that causes the actuators to produce the actuator response.

DETAILED DESCRIPTION OF THE INVENTION

The invention described herein involves a communication and computation structure using analog electronics for allocating actuation in a way that greatly reduces the number of control lines. In particular, the invention is compatible with hierarchical smart matter control. A reduction in communication bandwidth for smart matter systems is obtained by addressing groups of actuators of a size given by a correlation region rather than by addressing each actuator individually.

A correlation region is determined by the actuation system, the requirements of the application, and the physics of the system. In brief, for many large area actuator systems, the actuation of nearby actuators are highly or completely correlated, i.e. if a neighbor actuates with a given intensity, its neighbors are likely to actuate with a comparable intensity.

Depending on the context, a correlation region can refer to a correlation length or area. For example, a printing machine may use air jets to apply forces at various locations on a sheet of paper to control the motion of the sheet as it passes through various stages of the machine. The number of air jets needed to control the sheet in one dimension and in two dimensions is determined by a correlation length and a correlation area, respectively. The correlation area, for example, is approximately the area of the sheet of paper divided by the minimum number of locations at which forces need to be applied to properly control the motion of the sheet in two dimensions. For a typical 8½ by 11 sheet of office paper having an area of 93.5 square inches, forces need to be applied at a minimum of approximately four locations to control the motion of the sheet in two dimensions in a printer. Thus, in this case, the correlation area is approximately 25 square inches. If the 8½×11 motion were controlled in one dimensional position and angle, then forces would need to be applied at only two locations to control the sheet, giving a correlation area of approximately 50 square inches. If the sheet stretches or if the height of the sheet also needs control, the correlated region would be much smaller. Therefore, the correlation region is a function of the application and the material to which the actuator forces are being applied. Within a correlation area, there is no need for fully independent control of the actuators applying the forces. This observation implies that it is not necessary to have electrodes that control actuators separately within a correlation area.

In some embodiments considered below, it is assumed that voltages applied to the control lines control rows of actuators. It should be understood that many other control signals such as power, current, frequency, pressure, etc. can be used instead. In addition, in some embodiments considered below, the actuator response to the control signal is a force, which can be proportional to the voltage for analog actuators and can be thresholded for discrete actuators. However, other actuator responses besides force can be produced, such as heat, chemical emissions, and swellings. Rather than running a separate line to each row, the control lines are connected by resistive strips in groups. (The strips here would be electrically resistive, but could, for example, be resistive to fluid flow in the case that pressure is the sensed signal and fluid flows are the currents which flow in response to pressure settings. In the remainder of this teaching electrical voltages, currents and resistive media will be assumed for the sake of simplicity in description.) The size of such a group corresponds to the correlation region, the size over which the actuation is expected to be correlated. Each end of each resistive strip can be connected to an analog output channel of the computer.

Figure 2:
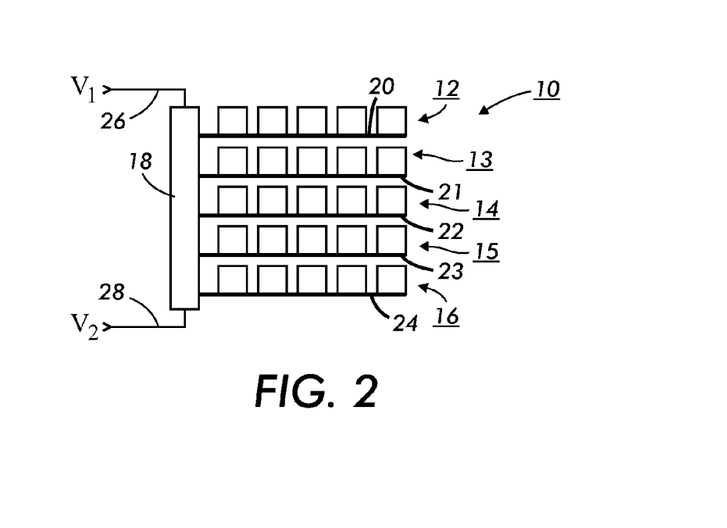
FIG. 2 shows an actuator system, according to the teachings of the present invention.

Referring to FIG. 2, an actuator system 10 is shown according to the teachings of the present invention. The actuator system 10 includes a plurality of rows of actuators 12-16 capable of exerting a force in response to a control signal. More specifically, a row of actuators has an associated local means, either analog or digital, to transform the control signal to an actuator response. The response can be proportional, thresholded or any single-valued function of the control signal. In one example, the actuators are air jets that exert a force on a sheet of paper in a printing machine. The actuator system 10 also includes a resistive strip 18 connected to the plurality of rows of actuators 12-16 via electrodes 20-24. The actuator system 10 further includes a first electrode 26 having a first voltage connected to the resistive strip 18 and a second electrode 28 having a second voltage connected to the resistive strip 18.

The rows of actuators 12-16 are capable of producing an actuator response, such as a force, in reply to a control signal transmitted via the first electrode 26 and the second electrode 28. The first electrode 26 is held at a fixed first voltage $V_1$ and the second electrode 28 is held at a second fixed voltage $V_2$. With both voltages applied a current flows through the resistive strip and provides a voltage division at a point along the resistive strip proportional to the distance of the point from an electrode. In one embodiment, the actuators in a particular row are all held at the same voltage, which can be found by linear interpolation. For example, assuming the length of the resistive strip 18 is L, and that electrode 15 is at a distance of L/5 from electrode $V_2$, then the voltage of electrode 15 is $[(V_1-V_2)/L]L/5-V_2$. The magnitude of the force exerted by an actuator in a particular row can be proportional to the voltage of the electrode connecting the actuators in the particular row. Therefore, by choosing appropriate values for $V_1$ and $V_2$, it is possible to approximate a desired actuation profile.

Figure 3:
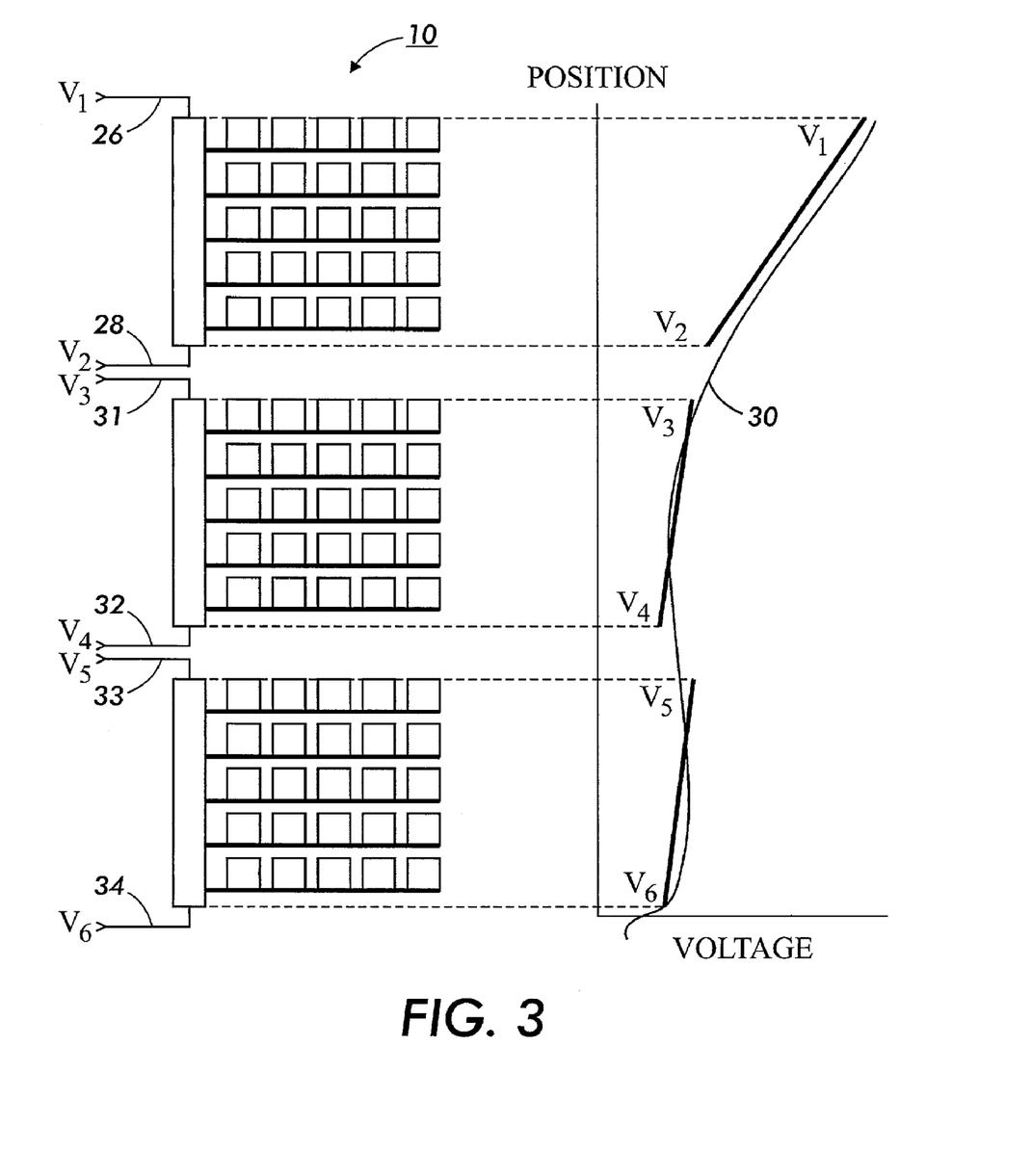
FIG. 3 shows a number of actuator systems of FIG. 2 that give rise to an actuation profile that approximates a desired actuation profile, according to the teachings of the present invention.

Referring to FIG. 3, a number of actuator systems 10 are shown that help give rise to an actuation profile that approximates a desired actuation profile 30. The voltages $V_1$ of the first electrode 26 and $V_2$ of the second electrode 28 may be chosen so that $V_1-V_2$ and $(V_1+V_2)/2$ approximate the average slope and average value of the desired actuation profile over the length L. The voltages $V_3$ of the third electrode 31 and $V_4$ of the fourth electrode 32, and the voltages $V_5$ of the fifth electrode 33 and $V_6$ of the sixth electrode 34 can similarly be chosen so as to approximate the desired actuation profile over the respective lengths bounded by the electrode pairs, as shown in FIG. 3.

Figure 4:
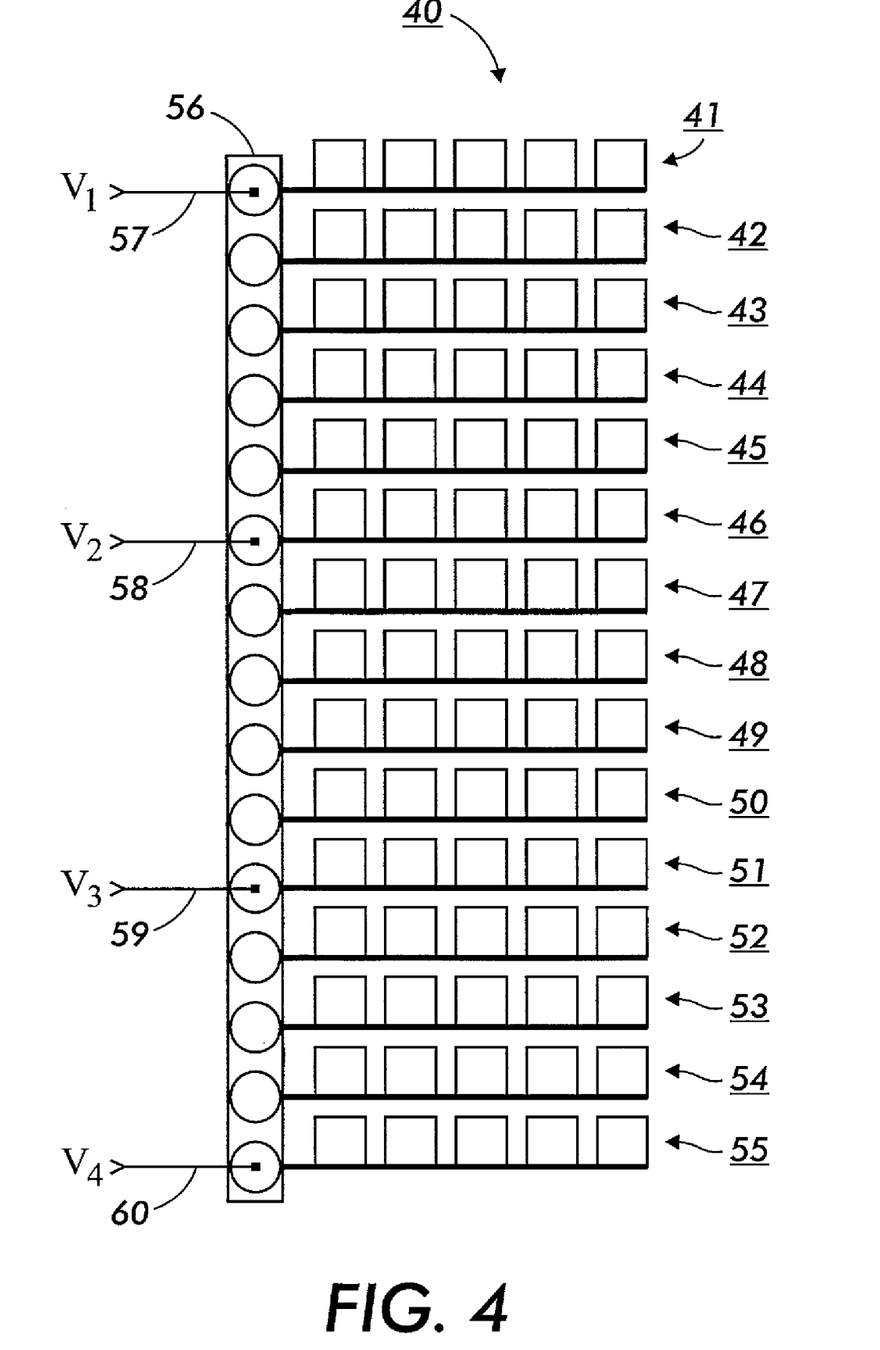
FIG. 4 shows another embodiment of an actuator system, according to the teachings of the present invention.

Referring to FIG. 4, another embodiment of the present invention is shown for improving the approximation to the desired actuation profile 30. The actuator system 40 includes a plurality of rows of actuators 41-55 capable of producing an actuator response, such as a force, in response to a control signal. A resistive strip 56 is connected to the plurality of rows of actuators 41-55. The actuator system also includes four electrodes 57-60 having a voltage $V_1, \ldots, V_4$, each electrode being connected to the resistive strip 56. In particular, electrodes 57-60 are connected to rows 41, 46, 51, and 55. It should be understood that in other embodiments the electrodes can be connected to other rows.

The rows of actuators 41-55 help to deliver forces, for example, to an object, such as a sheet of paper in a printing system. The electrodes 57-60 transmit a control signal to the rows of actuators 41-55 to thereby cause the actuators to exert forces. To help transmit this signal, Electrode 57, for example, maintains a voltage of $V_1$ to all the actuators in row 41. The distance between any two adjacent electrodes is substantially equal to a correlation length of the plurality of rows of actuators 41-55.

Figure 5A:
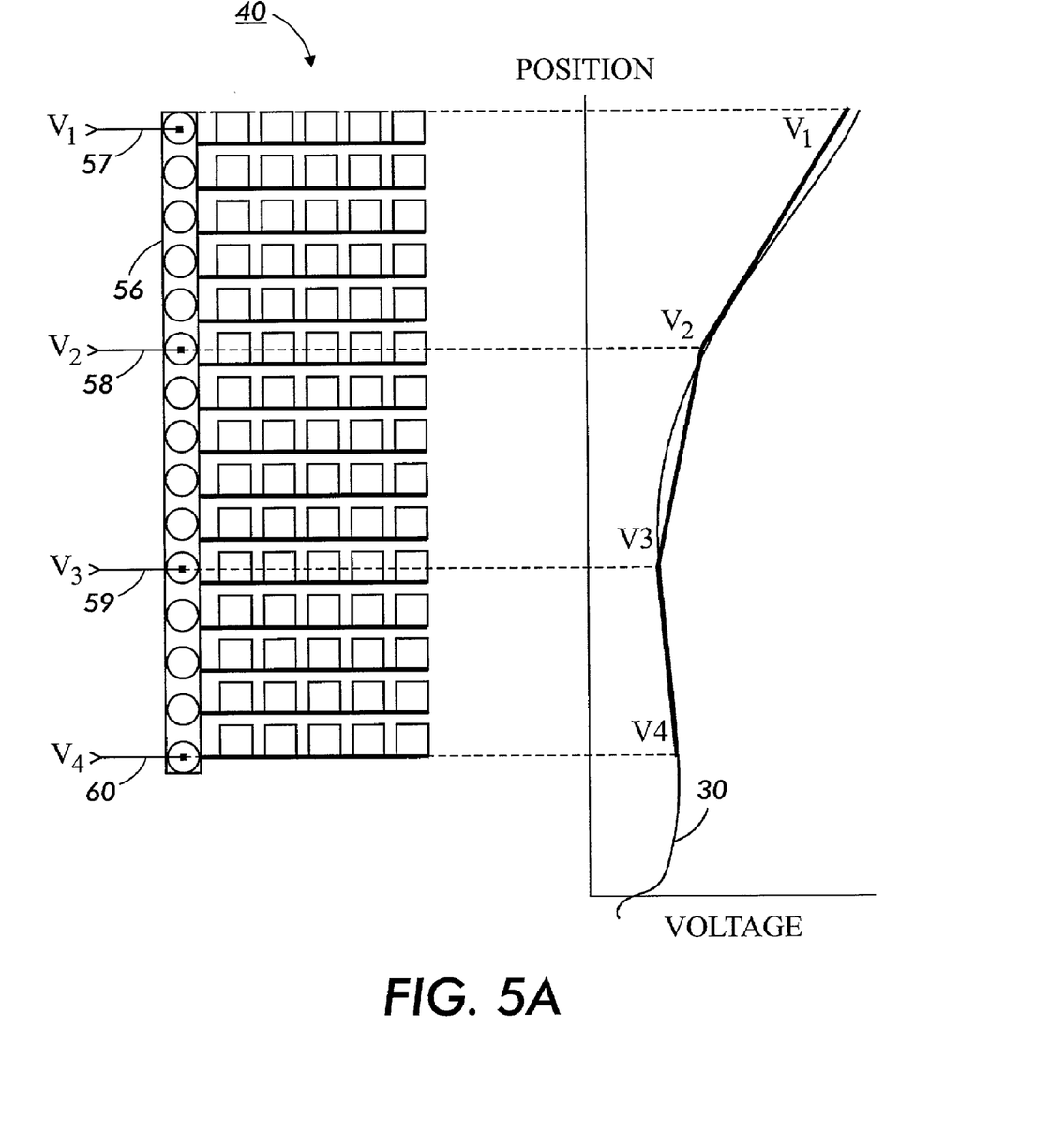
FIG. 5A shows the actuator system of FIG. 4 and an approximate actuation profile produced by such a system that approximates a desired actuation profile, according to the teachings of the present invention.

Referring to FIG. 5A, the actuator system 40 is shown for approximating the desired actuation profile 30. The voltages $(V_j+V_{j+1})/2$, for each j satisfying $1 \leq j \leq 3$, are chosen to approximate the desired actuation profile 30. In addition, the voltages $(V_j-V_{j+1})$, for each j satisfying $1 \leq j \leq 3$, are chosen to approximate the desired actuation profile 30. Specifically, the voltages $(V_j+V_{j+1})/2$ are chosen to substantially equal an average value of the desired actuation profile over a position substantially equal to a location of the portion of the resistive strip between the jth and jth+1 electrodes. The voltages $(V_j-V_{j+1})$ are chosen to substantially equal an average slope of the desired actuation profile 30 over a position substantially equal to a location of the portion of the resistive strip between the jth and jth+1 electrodes.

Figure 5B:
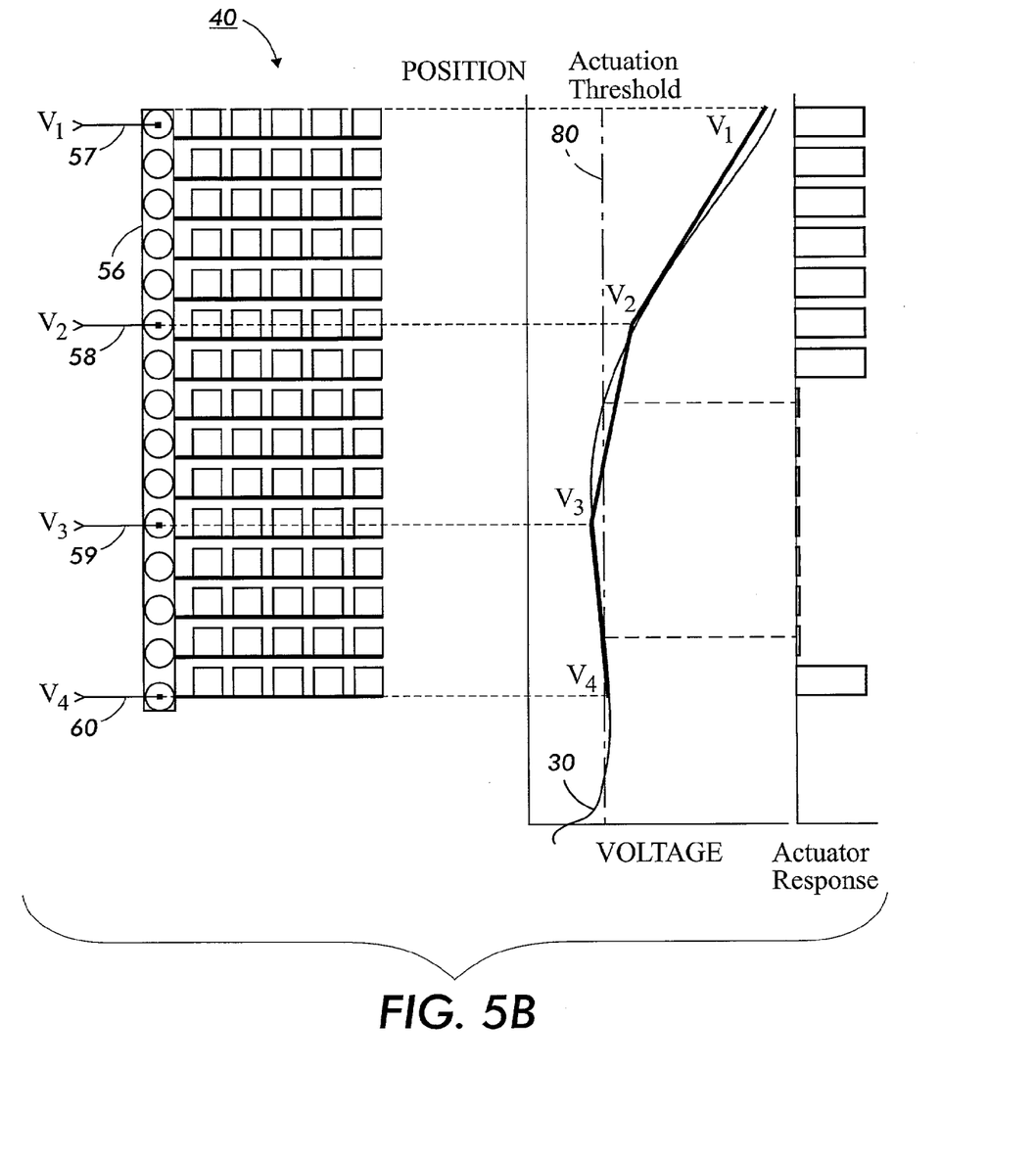
FIG. 5B shows the actuator system of FIG. 4 where the actuators produce discrete values, according to the teachings of the present invention.

As shown in FIG. 5B, the resistive strip 56 can also be used with discrete actuators. In this case, the actuator force cannot assume arbitrary values but rather can assume only one of two values, zero and some non-zero discrete value that is given by the horizontal length of the rectangles in the plot at the right of FIG. 5B. In this case, an actuation threshold 80 determines which state the actuator is in. The resistive strip is used to produce a linear approximation to a continuous voltage profile. The actuation that actually occurs is a threshold version. The distribution of actuation can be adjusted by controlling the position at which the voltage profile crosses the threshold.

Figure 5C:
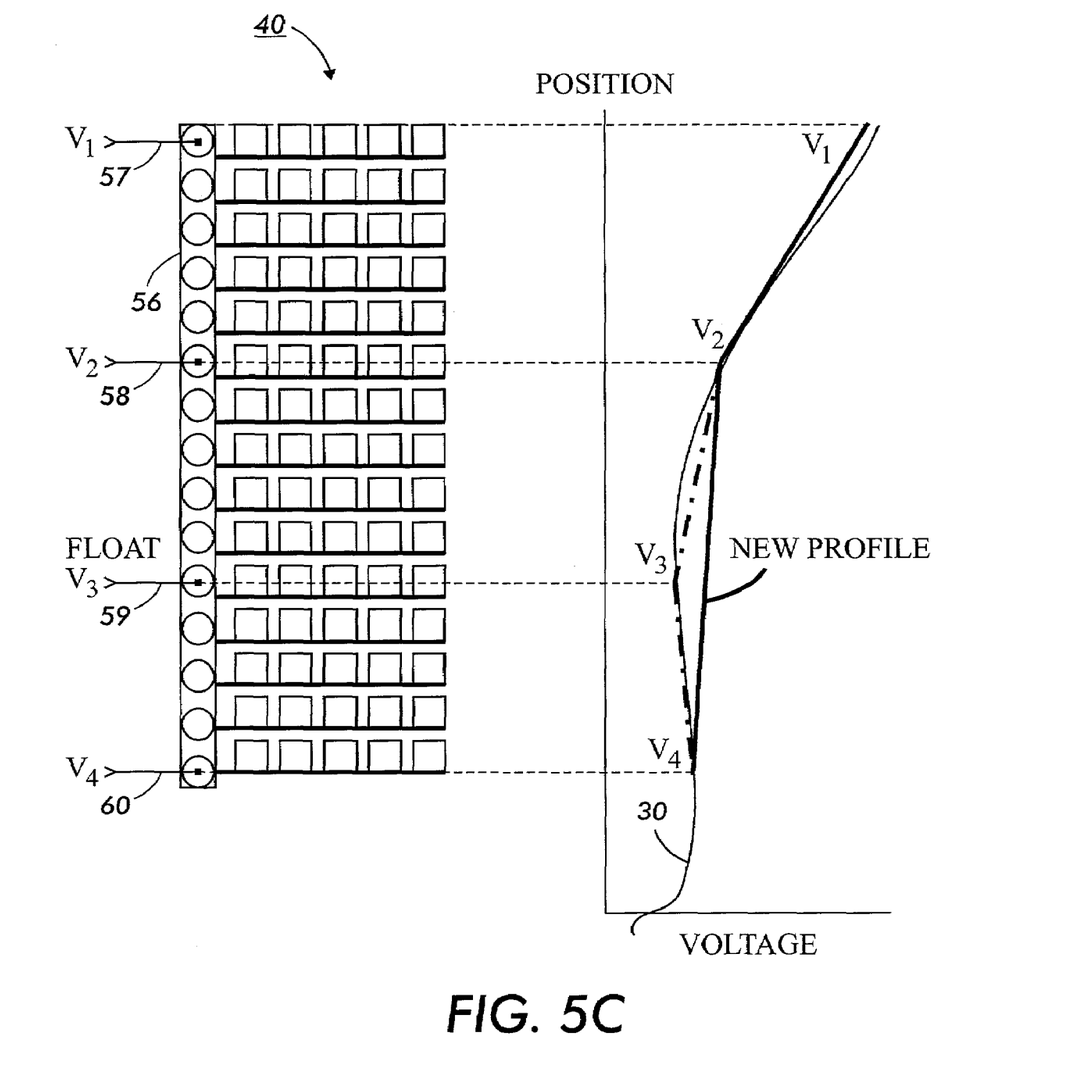
FIG. 5C shows the actuator system of FIG. 4 where one electrode is allowed to float, according to the teachings of the present invention.

As shown in FIG. 5C, the size of the correlation region can also be adjusted electronically. If the electrode 59 is allowed to float, i.e., if the voltage of the electrode is not fixed, the area bounded by electrode 58 and electrode 60 where the voltage is fixed defines the new correlation region. This new correlation region is twice the size of the old. Thus, the size of the correlation region can be adjusted by allowing various electrodes to float. The dynamic adjustment of the correlation region is an advantage of the current invention that could not be obtained by fixed connections.

In one embodiment, actuation allocation is implemented according to the relationship $$f_i = \frac{F_y}{N_y} + \lambda_w(x_i - \bar{x}) = \frac{F_y}{N_y} + \frac{(T_z - \bar{x}F_y)}{N_y \sigma^2}(x_i - \bar{x}) \quad \text{(Eq. 1)}$$

where $i=1 \ldots N$ runs through the number of actuator rows under the sheet of paper. $F_y$ is the y directed force, $T_z$ is the torque about the z-axis, $N_y$ is the number of jets under the sheet of paper, $x_i$ is the position of the ith row of actuators, x is the average position of the rows and $\sigma$ is the standard deviation of the rows from the average. Because $N_y$ and $\lambda_w$ are constant for each jet, one merely needs to apply two voltages to the resistive sheet at the rows bounding the sheet location with $(V_1+V_2)/2$ proportional to $1/N_y$ and $V_1-V_2$ proportional to $\lambda_w$. This will generate an approximation of the control voltage that will control the air jets even though only two voltages are applied. One must of course consider that in the case of discrete actuation, this process will only approximate the desired actuation profile.

Figure 6:
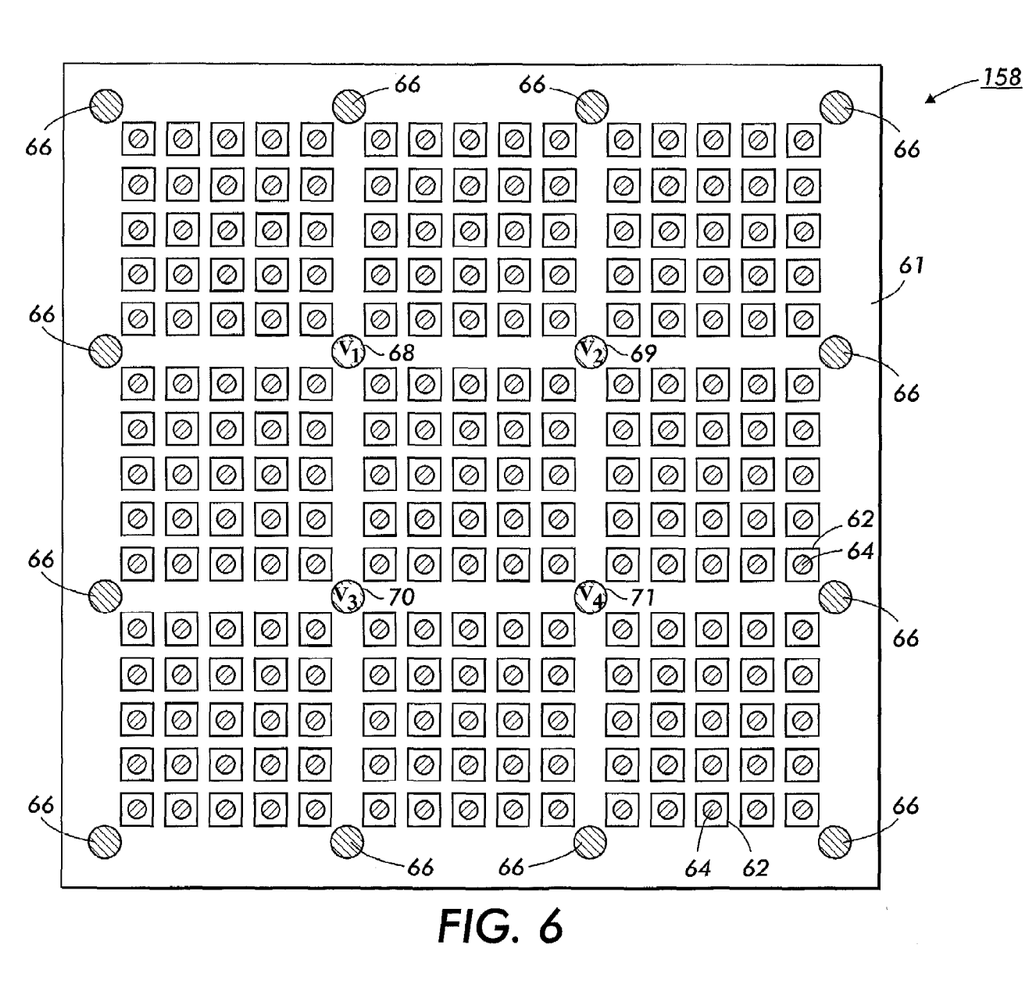
FIG. 6 shows a two-dimensional actuator system according to the teachings of the present invention.

The examples of FIGS. 2-5 involve one dimension with a particular correlation length. Two dimensions can be similarly treated. In FIG. 6, a two-dimensional actuator system 58 is shown. The one-dimensional resistive strip 18 of FIG. 2 is replaced by a two-dimensional resistive sheet 61 electrically coupled to an array of actuators 62 via resistive sheet contacts 64 (only some of the actuators and contacts are numbered for clarity). Each member of the array of actuators 62 makes electrical contact with the resistive sheet 61. Electrodes 66 fix the voltage of the resistive sheet 61 at those locations where the electrodes 66 and the resistive sheet 61 are in contact. Alternatively, the resistive sheet can be replaced by a lattice of interconnected resistive strips, or a lattice of discrete resistors.

The voltages of the electrodes 66 deposited on the resistive sheet are so chosen to produce a desired two-dimensional pattern of voltages to control the array of actuators 62. By suitable adjustment of four voltages on a rectangular array of 4 electrodes, the average and the average gradient for both orthogonal directions can be adjusted. For example, four electrodes 68-71 having voltages $V_1, \ldots, V_4$, respectively, are highlighted in FIG. 6. Assuming the origin of a Cartesian coordinate system is chosen to be at the location of $V_3$, with $V_1$ located at (0,1), $V_2$ at (1,1) and $V_4$ at (1,0), then the voltage in the square having corners at these locations is given by $$V(x,y)=V_3(1-x)(1-y)+V_1(1-x)y+V_4x(1-y)+V_2xy$$

By varying the voltages $V_1, \ldots, V_4$, various two-dimensional actuation profiles can be achieved.

The time response of the actuator system 58 can be determined by recognizing that the voltage in the resistive sheet 60 on a capacitive layer with a resistance per square, R (thus the sheet resistance of a segment of sheet L long by w wide is RL/w and for any square, where L=w, the resistance is R) and capacitance per unit area, C, is given by $$\frac{\partial V}{\partial t} = \frac{1}{RC}\nabla^2 V \quad 5$$

Therefore, the time constant for the voltage to "diffuse" a distance L is given by:

$$t=RCL^2$$

Thus, the desired time response places constraints on R and C of the resistive sheet 60. Quick time responses are achieved with small R, C and L. Time responses in the 10-100 microseconds are easily attainable with amorphous silicon, crystalline silicon, organic conductors such as polyaniline, etc.

By applying the principles of the present invention, the wire count required to control the actuator system is reduced. In addition, greatly reduced data flows (in the case of the paper, only two analog voltages are needed to control $F_y$ and $T_z$ of a sheet) can be achieved. The principles of the present invention also admit local control from local sensors and excellent scaling with numbers of actuators into the smart matter regime. By allowing smart matter actuators to be addressed in groups, rather than individually, with an adjustable size of the grouping, more efficiency can be attained. A further improvement is that the average variations (or gradient) of actuation from actuator to actuator can also be accommodated. The number of lines can be reduced by a factor of twenty-five or more. The data rate in real time operating systems can be greatly reduced as only averages and, optionally, gradients need to be transmitted to the actuator array.

Figure 7:
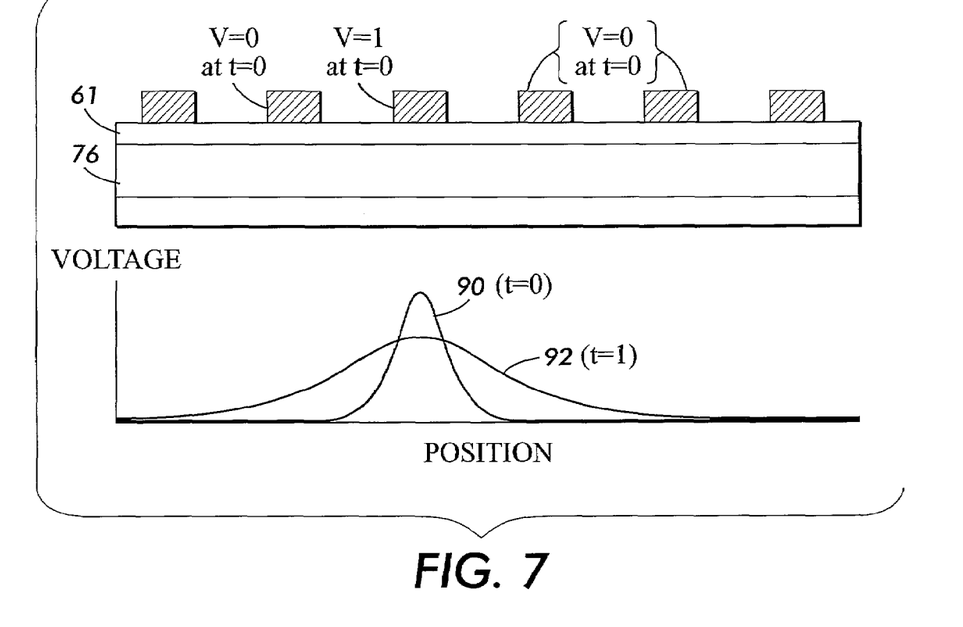
FIG. 7 shows a cross section of the actuator system where a resistive sheet is disposed on a capacitive layer, according to the teachings of the present invention.

The correlation region size can also be controlled temporally. Referring to FIG. 7 a cross section of the actuator system 60 is shown where a resistive sheet 60 is disposed on a capacitive layer 76. The voltage follows from Eq. 1. For a point source, this equation has a Gaussian solution. The initial Gaussian solution 90 has a larger standard deviation than the later Gaussian solution 92 at t=1. The standard deviation increases with time. Therefore, sampling the control voltage at various time intervals with a sample and hold system can control the width of the correlation region.

Figure 8:
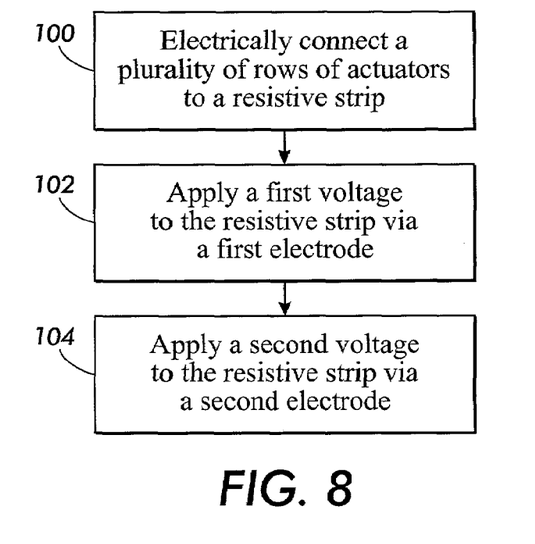
FIG. 8 shows a flow chart for exerting forces using an actuator system, according to the teachings of the present invention.

Referring to FIG. 8, a flowchart for producing an actuator response is shown. In step 100, a plurality of rows of actuators is electrically connected to a resistive strip, the actuators capable of exerting a force in response to a control signal. In step 102, a first voltage is applied to the resistive strip via a first electrode. Subsequently, in step 104, a second voltage is applied to the resistive strip via a second electrode. The application of the first voltage and the second voltage provide the control signal that causes the actuators to produce the actuator response.

Those skilled in the art will recognize, or be able to ascertain using no more than routine experimentation, many equivalents to the specific embodiments and methods described herein. Such equivalents are intended to be encompassed by the scope of the following claims.

What is claimed:

1. A system for producing an actuator response, the system comprising
    a plurality of rows of actuators capable of producing an actuator response in reply to a control signal;
    a resistive strip connected to the plurality of rows of actuators; and
    N electrodes, where N is an integer greater than one, having a voltage $V_1, \ldots, V_N$, each electrode being connected to the resistive strip to transmit the control signal to the rows of actuators to thereby cause the rows of actuators to produce the actuator response, wherein a particular one of the N electrodes is allowed to float, thereby increasing a correlation region.

2. The system of claim 1, such that the distance between two adjacent electrodes is substantially equal to a correlation length of the plurality of rows of actuators.

3. The system of claim 1, wherein $(V_j+V_{j+1})/2$, for each j satisfying $1 \leq j \leq N-1$, is chosen to approximate a desired actuation profile.

4. The system of claim 3, wherein $(V_j+V_{j+1})/2$ is chosen to substantially equal an average value of the desired actuation profile over a position substantially equal to a location of the portion of the resistive strip between the jth and jth +1 electrodes.

5. The system of claim 1, wherein $(V_j-V_{j+1})$, for each j satisfying $1 \leq j \leq N-1$, is chosen to approximate a desired actuation profile voltage.

6. The system of claim 5, wherein $(V_j-V_{j+1})$ is chosen to substantially equal an average slope of the desired actuation profile over a position substantially equal to a location of the portion of the resistive strip between the jth and jth +1 electrodes.

7. The system of claim 1, wherein each of the plurality of rows of actuators can produce two discrete actuator responses.

8. A system for producing an actuator response, the system comprising
    a resistive sheet;
    an array of actuators electrically connected to said resistive sheets via contacts; and
    a plurality of electrodes for fixing voltages on the resistive sheet, wherein by varying the voltages a desired actuation profile can be produced by the array of actuators to produce the actuator response; and
    a capacitive layer coupled to the resistive sheet to allow a correlation region to depend on time.

9. The system of claim 8, wherein the plurality of electrodes includes at least four electrodes for fixing voltages, $V_1, \ldots, V_4$ on the resistive sheet, wherein by varying the voltages $V_1, \ldots, V_4$ a desired actuation profile can be produced by the array of actuators to produce the actuator response.

10. The system of claim 9, wherein, if the four voltages lie substantially at points (0,0), (1,0), (0,1) and (1,1) of a Cartesian coordinate system, the desired actuation profile, expressed as voltage V(x,y) as a function of position within a square having corners at said points, is given substantially by $$V(x,y)=V_3(1-x)(1-y)+V_1(1-x)y+V_4x(1-y)+V_2xy.$$

* * * * *